United States Patent [19]
Freund, Jr. et al.

[11] 4,262,542
[45] Apr. 21, 1981

[54] FAMILY OF MAGNETIC FLOWMETERS

[75] Inventors: William R. Freund, Jr., Hatfield; John C. Grebe, Jr., Norristown, both of Pa.

[73] Assignee: Emerson Electric Co., St. Louis, Mo.

[21] Appl. No.: 82,761

[22] Filed: Oct. 9, 1979

[51] Int. Cl.³ .............................................. G01F 1/58
[52] U.S. Cl. ................................................ 73/861.12
[58] Field of Search ........... 73/861.12, 861.13, 861.15, 73/861.16, 861.17

[56] References Cited

U.S. PATENT DOCUMENTS

| | | | |
|---|---|---|---|
| 3,309,924 | 3/1967 | Kolin et al. | 73/861.12 |
| 3,373,608 | 3/1968 | Ketelsen | 73/861.12 |

*Primary Examiner*—Charles A. Ruehl
*Attorney, Agent, or Firm*—Polster, Polster and Lucchesi

[57] ABSTRACT

A family of magnetic flowmeters of different sizes ranging from at least as small as two inches in diameter to at least as large as twenty inches in diameter share a common low power coil driving circuit and a common signal processing circuit. The meters have coils which share proportional geometry and which have no magnetic core.

6 Claims, 2 Drawing Figures

FAMILY OF MAGNETIC FLOWMETERS

BACKGROUND OF THE INVENTION

This invention relates to magnetic flowmeters and in particular to a family of flowmeters having the novel characteristic of utilizing the same coil driving power and producing substantially the same voltage output for a given average flow velocity over a wide range of sizes, from less than two inches in diameter to over twenty inches in diameter.

In an electromagnetic flowmeter, electromagnet coils arranged around a flow tube are energized by a driver circuit to produce a magnetic field across the flow tube. The magnetic field generates a voltage in a fluid flowing through the tube. The voltage, which is proportional to flow rate, is sensed by a pair of electrodes in contact with the fluid, and is amplified by a different amplifier to produce a flow-dependent signal which is amplified by a signal processing system to produce an output signal proportional to flow rate. Generally, the coils are provided with a core of ferromagnetic material, either in the form of an external yoke or in the form of the body of the meter tube when the coils are placed inside the tube. The driver circuit and the signal processing system are generally separate components which must, nonetheless, be separately designed for different sizes of meters. For example, the driver circuit may consume about twenty-five watts of power for a three inch diameter meter, and require about one hundred-fifty watts for a thirty inch meter.

SUMMARY OF THE INVENTION

One of the objects of this invention is to provide a family of magnetic flowmeters having a size of from less than six inches to more than twenty inches all of which consume less power than presently known meters and all of which may be operated from the same power supply.

Another object is to provide such a family of flowmeters which produce generally the same output voltage for a particular average flow velocity of the fluid being metered, regardless of the size of the meter.

Another object is to provide such a family of flowmeters which may easily be characterized by a quantitative calibration constant, so as to permit calibration of signal processing systems on the basis of this constant.

Other objects will occur to those skilled in the art in light of the following description and accompanying drawing.

In accordance with this invention, generally stated, a family of magnetic flowmeters of different sizes is provided, each of the flowmeters comprising a body adapted to be connected in a flow system for measuring the flow of a fluid therethrough, coil means for generating a magnetic field in the fluid flowing through the body, a coil drive circuit for producing an excitation current in the coil means, a pair of electrodes in the meter body for producing a flow-dependent signal dependent on the electric field generated in the fluid flowing through the magnetic field, and signal processing means for amplifying the flow-dependent signal to produce an output signal dependent thereon, wherein each flowmeter in the family produces substantially the same output signal for a given average velocity of flow and consumes substantially the same excitation power, the coil means of each flowmeter being air core coils, the coil drive circuit of each flowmeter producing an identical pulsed DC excitation current, and the coil means of each flowmeter being sized such that the strength of the magnetic field is inversely proportional to the separation of the electrodes. Preferably, each of the meter bodies is tubular and each of the coil means is formed as a rectangle formed to the tubular body. Also preferably, each of the coil means has the same number of turns and each of the coil means is of the same geometry relative to the meter body, in the range from at least as small as about six inches in diameter to at least as large as about twenty inches. By modification of the coil geometry, the range of sizes of the meters is easily extended to below two inches.

Each of the coil means is constructed such that the same power supply will drive the same current through it. Because of the geometry of the coil means and because of the lack of a ferromagnetic core, the coils produce a magnetic field which is highly proportional to the current, and output can be predicted without any calibration to a tolerance of plus or minus ten percent.

DESCRIPTION OF THE PREFERRED EMBODIMENT

Figure 1:
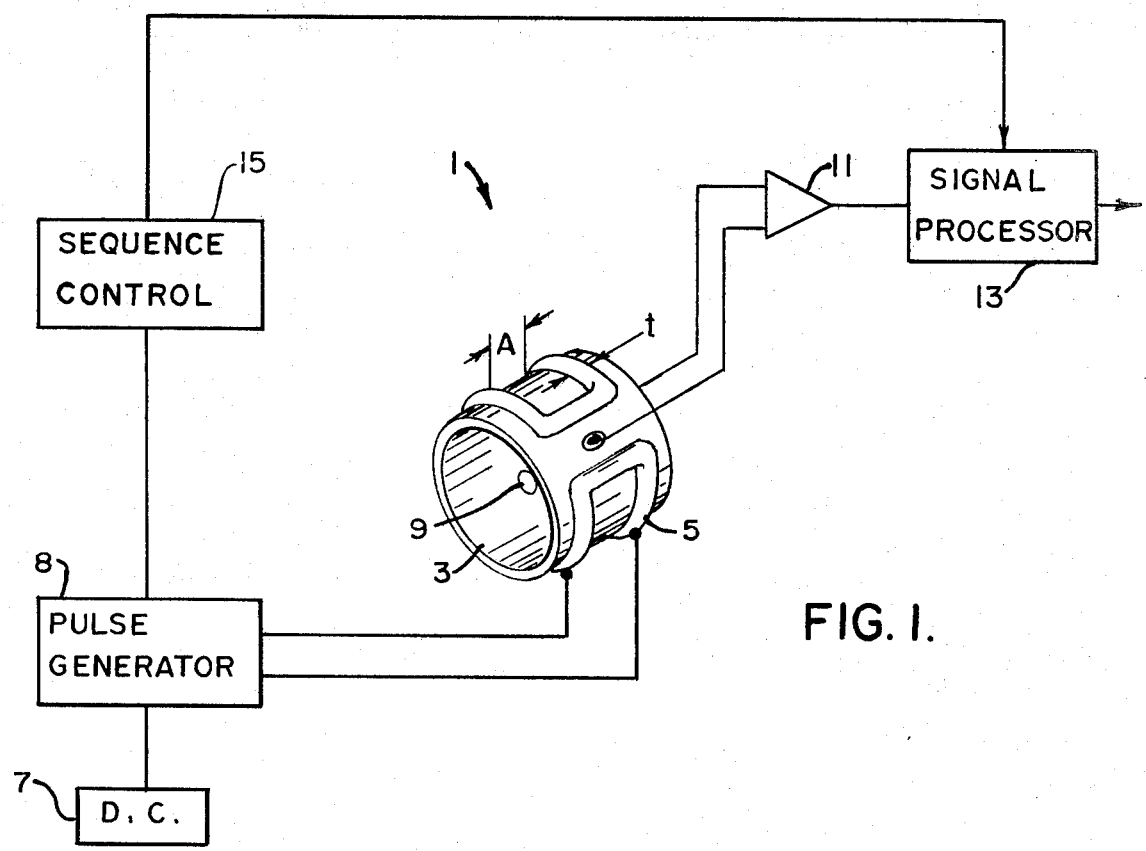
FIG. 1 is a view in perspective of a magnetic flowmeter of a family of flowmeters of the present invention.

Referring now to the drawings, and in particular to FIG. 1, reference numeral 1 indicates a magnetic flowmeter system representative of a family of flowmeters of the present invention. The flowmeter system 1 includes a flow tube 3, a pair of oppositely disposed electromagnetic coils 5 energized from a direct current source 7 through a pulse generator 8, and a pair of electrodes 9 which sense a voltage generated by the flow of an electrically conductive fluid through the magnetic field produced by the coils 5 across the tube 3. The voltage across the electrodes 9 is amplified by a differential amplifier 11 and converted to an output signals by a signal processing chain 13. The activation of the coils and the operation of the signal processing chain 13 is controlled by a sequencer 15.

In accordance with the present invention, the coils 5 are air core coils and are configured to provide an acceptable output signal level at a low level of power consumption. The pulsed direct current coil drive system preferably produces a train of pulses of the same polarity, but may instead produce a train of pulses of alternating polarity or an alternating "square wave" signal. The use of a direct current drive system is, however, imporant in the operation of the invention.

The working equation for the meter system 1 is:

$$V = U/SdB$$

where V is the average velocity of the fluid, U is the potential difference at the electrodes, d is the electrode separation, B is a respresentative value of magnetic flux density, and S is a constant dependent on the geometry of the flow tube and magnetic field.

It has been determined experimentally that the shape of the magnetic field does not affect the linearity of the output for axisymmetric flows. It could, however, influence the value of S.

In a family of meters covering many sizes, it would be desirable to use a common set of processing electronics 13. By rewriting the above equation to $$U/V = SdB$$

it can be seen that the output for any meter size will be of the same magnitude if SdB is a constant. The value of S will not change as long as the geometry of the flow tube and magnetic field remains unchanged. The problem then becomes one of keeping the product of d and B a constant.

It has been found that, by maintaining the relative geometry of the coil and flow tube and using the same amp turns to produce the magnetic field, the value of B is such as to make the product of d and b a constant.

Since no ferromagnetic materials are in the magnetic circuit, B is proportional to NI, where N is the number of coil turns and I is current through the coil. It is particularly convenient to use the same number of turns for each coil in a family of flowmeters and to make the electrical resistance of the coils the same by choosing an appropriate wire gauge for a particular coil size.

Figure 2:
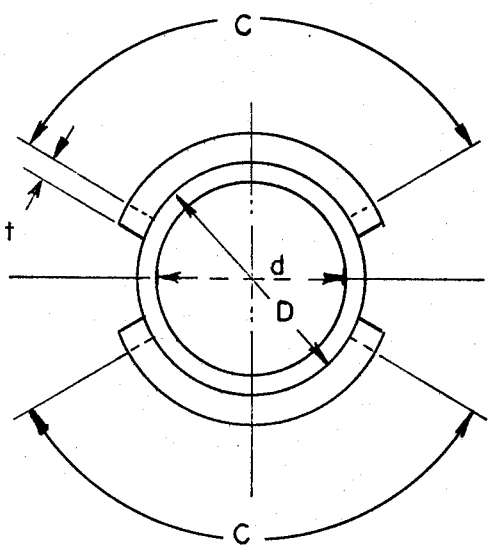
FIG. 2 is a diagrammatic view in end elevation of the meter of FIG. 1.

In the illustrative embodiment, the coils 5 are in the form of rectangles draped over the outside of the flow tube 3 and are connected electronically in series. Each coil 5 has an interior axial length A of about 0.7D, where D is the outside diameter of the flow tube 3, and an interior width C, when flat, of about $\pi D/3$. As shown in FIG. 2, each coil 5 thus encloses 120 degrees of the circumference of the tube 3. Each coil 5 nominally contains four hundred turns of wire. Because the dimensions A and C are chosen to be proportional to the flow tube diameter D, the total length of the wire in each coil is also proportional to D. The wire gauge is chosen to maintain a total resistance of fifteen ohms for the two coils. It will be seen that if the wire diameter for a given meter size is W, the coil thickness t is now 20W, since the coil is a twenty-by-twenty wire square in cross-section.

It has been found empirically that this configuration of the coils 5, with a one amp pulsed current through the coils 5, provides a constant electrode output of about 750 microvolts for each ten feet per second of average flow velocity, regardless of the inner diameter d of the meter flow tube 3 from a diameter of six inches to thirty inches or more. The output at the meter electrtodes varies from this nominal value by no more than plus or minus ten percent, and this variation at the flow tube may be compensated by calibration in the signal processing chain 13. It will be seen that all the members of the family have a coil power consumption of about fifteen watts.

The range of sizes of the meters of the illustrative family of meters may be extended downward to 1.5 inches, while still maintaining the same coil driver circuit and the same processing electronics. In smaller meter, however, several factors requie modification of the coil geometries and the number of turns in the coils. The coils become bulky because small guage wire can not carry the required current. The pipe thickness and coil thickness t becomes significant. The size of the electrodes limits the coil width C. Therefore, the axial length A of the coils is somewhat increased and the coil wire guage and number of coil turns are modified to maintain U/V constant.

Numerous variations in the family of flowmeters of the present invention, within the scope of the appended claims, will occur to those skilled in the art in light of the foregoing disclosure. Merely by way of example, the size and shape of the coils may be different. The coil excitation power may be changed somewhat. These variations are merely illustrative.

We claim:

1. A family of magnetic flowmeters of different sizes, each of said flowmeters comprising a body adapted to be connected in a flow system for measuring the flow of a fluid therethrough, coil means for generating a magnetic field in said fluid flowing through said body, a coil drive circuit for producing an excitation current in said coil means, a pair of electrodes in said meter body for producing a flow-dependent signal dependent on the electric field generated in said fluid flowing through said magnetic field, and signal processing means for amplifying said flow-dependent signal to produce an output signal dependent thereon, characterized in that each flowmeter in said family produces substantially the same output signla for a given average velocity of flow and consumes substantially the same excitation power, said coil means of each said flowmeter being air core coils, said coil drive circuit of each said flowmeter producing an identical pulsed DC excitation current, and said coil means of each said flowmeter being sized such that the strength of said magnetic field is inversely proportional to the separation of said electrodes.

2. The family of flowmeters of claim 1 wherein each of said meter bodies is tubular and each of said coil means is formed as a rectangle formed to said tubular body.

3. The family of flowmeters of claim 1 wherein each of said coil means has substantially the same number of turns and each of said coil means is of substantially the same geometry relative to said meter body.

4. The family of flowmeters of claim 1 wherein each of said meter bodies is tubular and said meter bodies in said family range in diameter from at least as small as about six inches to at least as large as about twenty inches.

5. The family of flowmeter of claim 4 wherein said meter bodies in said family range in diameter to at least as small as about two inches.

6. The family of flowmeters of claim 3 wherein each of said meter bodies is tubular and said meter bodies in said family range in diameter from at least as small as about six inches to at least as large as about twenty inches.

* * * * *

UNITED STATES PATENT AND TRADEMARK OFFICE
CERTIFICATE OF CORRECTION

PATENT NO. : 4,262,542
DATED : April 21, 1981
INVENTOR(S) : William R. Freund et al It is certified that error appears in the above—identified patent and that said Letters Patent is hereby corrected as shown below:

Column 1, line 18, "different" should be "differential".
Column 2, line 53, "alterinating" should be "alternating".
Column 2, line 55, "imporant" should be "important".
Column 3, line 16, "b" should be "B".
Column 4, line 3, "becomes" should be "become".
Column 4, line 29, "signla" should be "signal".

Signed and Sealed this

Ninth Day of February 1982

[SEAL]

Attest:

GERALD J. MOSSINGHOFF

Attesting Officer     Commissioner of Patents and Trademarks